US009041696B2

(12) United States Patent
Kwack et al.

(10) Patent No.: US 9,041,696 B2
(45) Date of Patent: May 26, 2015

(54) DISPLAY DEVICE

(71) Applicants: Jun-Ho Kwack, Yongin (KR); Joon-Sam Kim, Yongin (KR); Jong-Hwan Kim, Yongin (KR)

(72) Inventors: Jun-Ho Kwack, Yongin (KR); Joon-Sam Kim, Yongin (KR); Jong-Hwan Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 28 days.

(21) Appl. No.: 13/778,248

(22) Filed: Feb. 27, 2013

(65) Prior Publication Data

US 2013/0334981 A1 Dec. 19, 2013

(30) Foreign Application Priority Data

Jun. 14, 2012 (KR) ........................ 10-2012-0063857

(51) Int. Cl.
*G06F 3/038* (2013.01)
*H05B 37/02* (2006.01)
*G09G 3/00* (2006.01)

(52) U.S. Cl.
CPC . *H05B 37/02* (2013.01); *G09G 3/00* (2013.01)

(58) Field of Classification Search
CPC ......... G06F 3/041; G06F 3/016; G06F 3/038; G09G 5/00; G09G 3/36; G09G 5/02
USPC .......................... 345/156, 204, 205, 206, 694
See application file for complete search history.

(56) References Cited

U.S. PATENT DOCUMENTS

| | | | | |
|---|---|---|---|---|
| 2006/0020469 | A1 | 1/2006 | Rast | |
| 2007/0012489 | A1 * | 1/2007 | Kim et al. | 178/18.01 |
| 2008/0150885 | A1 | 6/2008 | Overwijk et al. | |
| 2011/0267284 | A1 * | 11/2011 | Lee et al. | 345/173 |
| 2011/0298747 | A1 | 12/2011 | Kim et al. | |
| 2012/0038613 | A1 | 2/2012 | Choi | |
| 2012/0120018 | A1 | 5/2012 | Koh et al. | |
| 2012/0146922 | A1 * | 6/2012 | Kang et al. | 345/173 |

FOREIGN PATENT DOCUMENTS

| | | | |
|---|---|---|---|
| JP | 2002-182582 | A | 6/2002 |
| JP | 2010-091990 | A | 4/2010 |
| KR | 10-2006-0070535 | A | 6/2006 |
| KR | 10-2013-0017313 | A | 2/2013 |
| KR | 10-2013-0055259 | | 5/2013 |
| TW | 201212745 | A | 3/2012 |

* cited by examiner

*Primary Examiner* — Minh D A
(74) *Attorney, Agent, or Firm* — Lee & Morse, P.C.

(57) ABSTRACT

A display device includes: a flexible display panel having a display area variably exposed in a first direction and including a conductive pattern; a sensing pattern positioned to correspond to the conductive pattern in the first direction; and a controller sensing a current flowing to one of the conductive pattern and the sensing pattern to display an image corresponding to the display area of the flexible display panel in the flexible display panel.

14 Claims, 11 Drawing Sheets

DISPLAY DEVICE

CROSS-REFERENCE TO RELATED APPLICATION

This application claims priority under 35 U.S.C. §119 to Korean Patent Application No. 10-2012-0063857 filed in the Korean Intellectual Property Office on Jun. 14, 2012, the entire contents of which are incorporated herein by reference.

BACKGROUND

1. Field

Embodiments relate generally to a display device. More particularly, embodiments relate to a display device including a flexible display panel.

2. Description of the Related Art

A display device is a device that displays an image. Recently, a flexible display device has gained attention.

The related art flexible display device includes a flexible display panel displaying an image. The flexible display device may be folded or rolled around a roll to thereby reduce the overall size thereof so as to be carried around.

The above information disclosed in this Background section is only for enhancement of understanding of the background of the described technology and therefore it may contain information that does not form the prior art that is already known in this country to a person of ordinary skill in the art.

SUMMARY

Embodiments are directed to a display device including a flexible display panel having a display area that is variably exposed in a first direction, the flexible display panel including a conductive pattern, a sensing pattern positioned to correspond to the conductive pattern in the first direction, and a controller sensing a current flowing to one of the conductive pattern and the sensing pattern, the controller controlling a display of an image in the flexible display panel, the image corresponding to the display area of the flexible display panel.

The sensing pattern and the conductive pattern may be spaced apart from each other.

The controller may include a voltage unit supplying a voltage to the conductive pattern and the sensing pattern, and a sensing unit sensing a current flowing to the conductive pattern.

The sensing pattern and the conductive pattern may contact each other.

The sensing pattern may include a first sub-sensing pattern and a second sub-sensing pattern spaced apart from each other in the first direction. The controller may include a voltage unit respectively supplying a voltage to the first sub-sensing pattern and the second sub-sensing pattern, and a sensing unit sensing the current flowing to the sensing pattern.

The display device may further include a housing for receiving the flexible display panel in the first direction such that the display area of the flexible display panel may be variably exposed in the first direction.

The housing may include a roll unit provided in the housing, the flexible display panel being wound on the roll unit.

The sensing pattern may be provided inside the housing corresponding to the conductive pattern.

One end of the flexible display panel may contact a plate surface of the flexible display panel provided in the first direction when a first area of the flexible display panel is variably bent such that the display area of the flexible display panel is variably exposed in the first direction.

The sensing pattern may be positioned at one end of the flexible display panel.

The conductive pattern may be arranged on the flexible display panel according to the first direction.

The conductive pattern may include a plurality of sub-patterns spaced apart from each other in the first direction.

The sub-patterns may be gradually lengthened or shortened in a second direction crossing the first direction according to a positioning along the first direction.

The conductive pattern may be gradually lengthened or shortened in a second direction crossing the first direction according to a positioning along the first direction.

DETAILED DESCRIPTION

Figure 1:
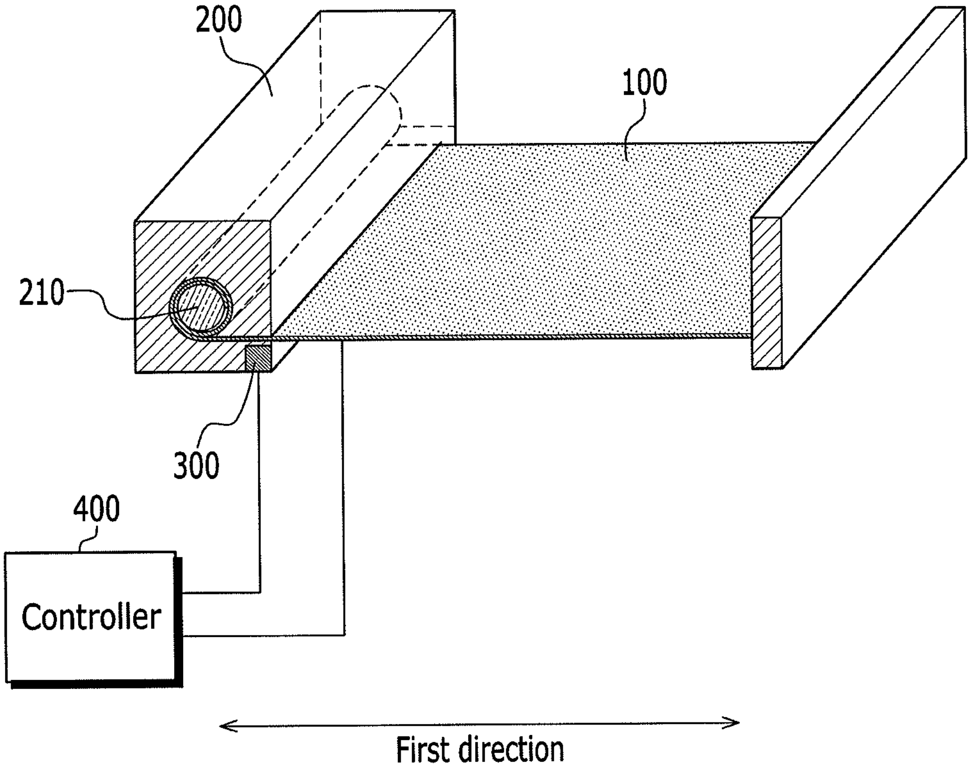
FIG. 1 is a schematic view of a display device according to an exemplary embodiment.

Embodiments will be described more fully hereinafter with reference to the accompanying drawings, in which exemplary embodiments are shown. As those skilled in the art would realize, the described embodiments may be modified in various different ways, all without departing from the spirit or scope thereof.

For clarification, the same elements or equivalents are referred to by the same reference numerals throughout the specification.

The size and thickness of each element are arbitrarily shown in the drawings. For example, in the drawings, the thickness of layers, films, panels, regions, etc., are exaggerated for clarity. In the drawings, the thickness of some of layers and regions are exaggerated for the sake of explanation. It will be understood that when an element such as a layer, film, region, or plate is referred to as being “on” another element, it may be directly on the other element or intervening elements may also be present.

In addition, unless explicitly described to the contrary, the word “comprise” and variations such as “comprises” or “comprising” will be understood to imply the inclusion of stated elements but not the exclusion of any other elements. Also, throughout the specification, “on” means that an element is positioned on or above or under or below another element and may not necessarily mean that an element is positioned at an upper side of another element based on a gravitation direction.

A display device according to an exemplary embodiment will be described with reference to FIG. 1 to FIG. 4.

FIG. 1 is a schematic view of a display device according to the exemplary embodiment.

As shown in FIG. 1, a display device according to the exemplary embodiment includes a flexible display panel 100, a housing 200, a sensing pattern 300, and a controller 400.

The flexible display panel 100 displays an image processed in the display device. For example, if the display device is provided as a portable terminal such as a mobile phone, the flexible display panel 10 may display an image such as a user interface (IU) or a graphic user interface (GUI). The flexible display panel 100 may include flexible substrates or films arranged opposite to each other, interposing liquid crystals or an organic light emitting diode therebetween. The flexible display panel 100 may be formed as a transparent or light transmissive type so as to allow the outside to be viewed therethrough. On a top side of the flexible display panel 100, a touch sensor formed as a touch film, a touch sheet, or a touch pad may be provided to sense a touch operation. The flexible display panel 100 is connected with the controller 400, and displays an image using a signal transmitted from the controller 400. The flexible display panel 100 has a characteristic of flexibility, and enters into and is discharged from the housing 200. The flexible display panel 100 enters into and is discharged along a first direction with respect to the housing 200. A display area of the flexible display panel 100 displaying the image is variably exposed to the outside while the flexible display panel 100 enters or is discharged. The flexible display panel 100 forms the display area that is variably exposed in the first direction.

Figure 2:
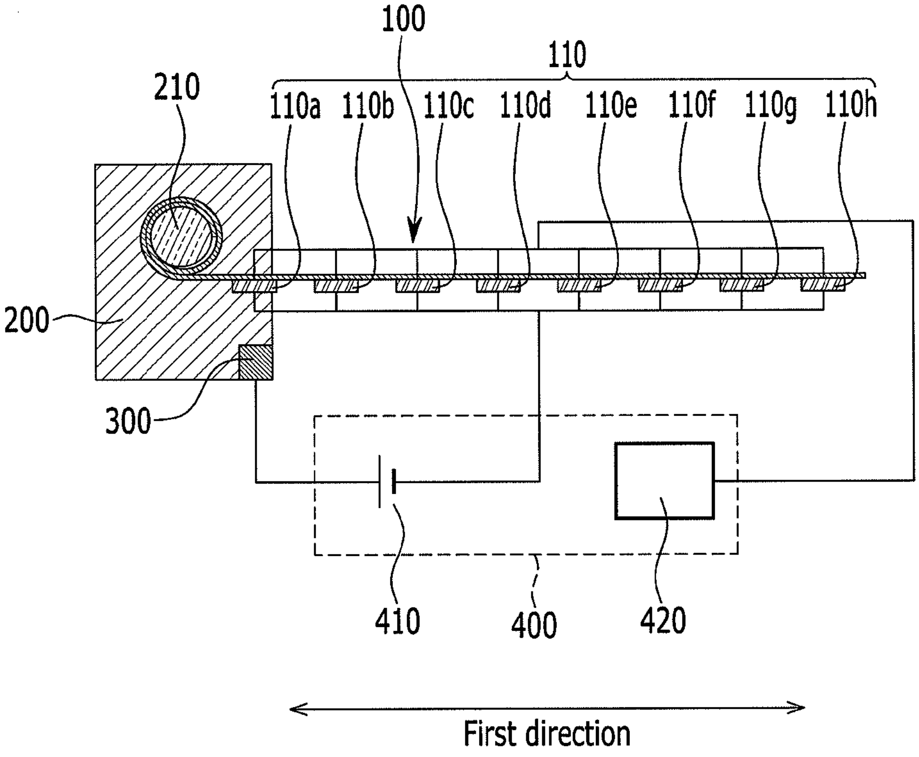
FIG. 2 is a schematic, cross-sectional view of a display device according to the exemplary embodiment illustrated in FIG. 1.
Figure 3:
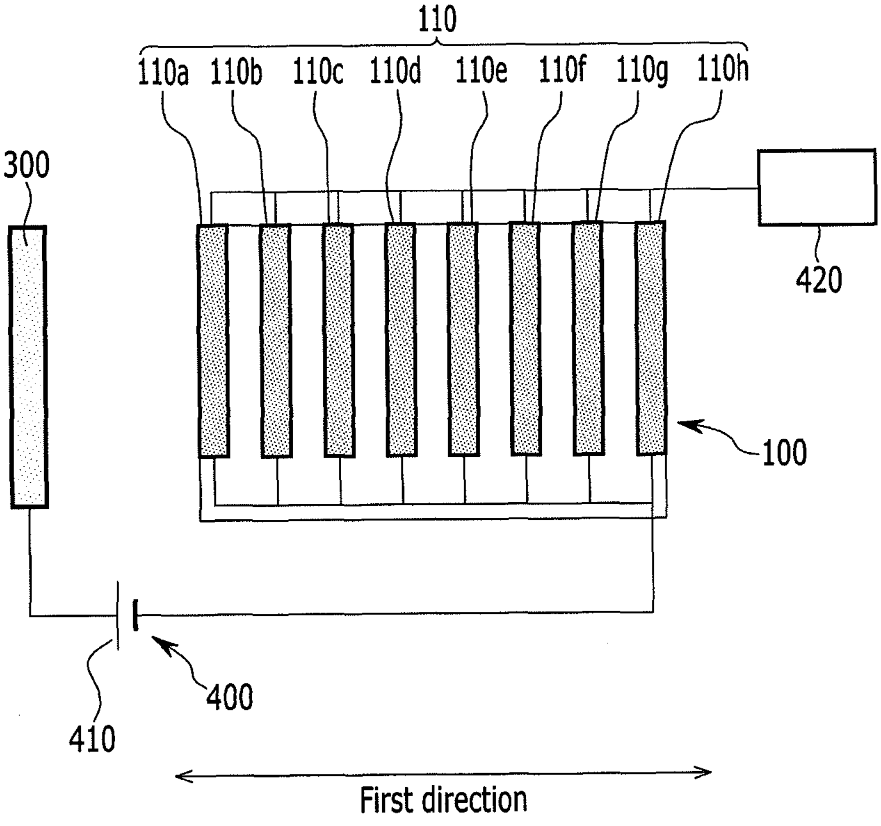
FIG. 3 is a schematic view of a flexible display panel of a display device according to the exemplary embodiment illustrated in FIG. 1.

FIG. 2 is a schematic, cross-sectional view of a display device according to the exemplary embodiment. FIG. 3 is a schematic rear view of a flexible display panel of a display device according to the exemplary embodiment, for better understanding and ease of description while simultaneously showing the sensing pattern 300.

As shown in FIG. 2 and FIG. 3, the flexible display panel 100 includes a conductive pattern 110 positioned at a region of a rear surface from where the image is displayed. In other implementations, the conductive pattern 110 of the display device may be positioned at one region of a front surface of the flexible display panel, where the image is displayed.

The conductive pattern 110 may be positioned on the front surface, the rear surface of the flexible display panel 100, or between two neighboring substrates. The conductive pattern 110 may be simultaneously formed when forming a wire or a touch sensor forming the flexible display panel 100, or may be additionally formed on the surface of the flexible display panel 100. The conductive pattern 110 is formed of a conductor having conductivity. A current flows to the conductive pattern 110 by a voltage supplied from the controller 400. The conductive pattern 110 is formed at the flexible display panel 100 according to the first direction as the direction in which the flexible display panel 100 enters or is discharged with respect to the housing 200. The conductive pattern 110 conducts the current according to the voltage supplied from each controller 400. The conductive pattern 110 includes a plurality of sub-patterns 110*a*-110*h* that are disposed to be spaced apart from each other according to the first direction. The sub-patterns 110*a*-110*h* have the same length in the first direction.

In other implementations, the sub-patterns 110*a*-110*h* spaced apart from each other in the first direction may have different lengths. A length of the sub-patterns 110*a*-110*h* may be gradually increased or decreased in the second direction intersecting the first direction, from one end sub-pattern 110*a* to the other end sub-pattern 110*h* among the plurality of sub-patterns 110*a*-110*h*. According to an implementation, the length of the plurality of sub-patterns 110*a*-110*h* in the second direction may be gradually decreased according to an arrangement in the first direction. In another implementation, from the one end sub-pattern 110*a* to the other end sub-pattern 110*h* among a plurality of sub-patterns 110*a*-110*h*, the length of the plurality of sub-patterns 110*a*-110*h* in the second direction may be gradually increased according to an arrangement in the first direction.

The housing 200 supports one end of the flexible display panel 100. The flexible display panel 100 enters and is discharged in the first direction such that the display area of the flexible display panel 100 is variably exposed in the first direction. The housing 200 includes a roll part 210 around which the flexible display panel 100 is rolled. The roll part 210 is positioned inside the housing 200 and supports one end of the flexible display panel 100. The roll part 210 rolls the flexible display panel 100 such that the flexible display panel 100 may enter and be discharged in the first direction from the housing 200. The roll part 210 may be automatically or manually rotated, and thereby the flexible display panel 100 may enter and be discharged in the first direction from the housing 200 according to self-rotation of the roll part 210.

The sensing pattern 300 is positioned inside the housing 200.

The sensing pattern 300 is positioned inside the housing 200 in the first direction while corresponding to the conductive pattern 110 foamed in the flexible display panel 100. The current flows to the sensing pattern 300, which may be spaced apart from the conductive pattern 110, by the voltage supplied from the controller 400. In the state that the sensing pattern 300 and the conductive pattern 110 are spaced apart from each other, the sensing pattern 300 and the conductive pattern 110 are respectively supplied with the voltage from the controller 400 such that a capacitance is formed in a space filled with air between the sensing pattern 300 and the conductive pattern 110.

The controller 400 connected to the sensing pattern 300 and the flexible display panel 100 senses the current flowing to the conductive pattern 110 and controls the displaying of an image on the flexible display panel 100, the image corresponding to the variable display area formed by the flexible display panel 100. The controller 400 includes a voltage unit 410 respectively supplying the voltage to the conductive pattern 110 and the sensing pattern 300, and a sensing unit 420 sensing the current flowing to the conductive pattern 110. If the voltages from the voltage unit 410 of the controller 400 are respectively supplied to the sensing pattern 300 and the conductive pattern 110 in a state that the sensing pattern 300 and the conductive pattern 110 are spaced apart from each other, the capacitance is formed in the space filled with air between the sensing pattern 300 and the conductive patterns 110 corresponding to the sensing pattern 300 such that the current flowing to the conductive pattern 110 having the capacitance is sensed by the sensing unit 420. Resultantly, the display area of the flexible display panel 100 that enters and is discharged from the housing 200 and is variably exposed to the outside according to the first direction is sensed by the sensing unit 420 of the controller 400.

If the conductive pattern 110 passes over the sensing pattern 300, a capacitance is formed between the conductive pattern 110 and the sensing pattern 300 facing each other and the sensing unit 420 senses the change of the current of the conductive pattern 110 that is generated by the change of the capacitance. Thereby, the display area of the flexible display panel 100 that enters and is discharged to be exposed from the housing 200 is sensed by the sensing unit 420. A coordinate value of the conductive pattern 110 of which the current change sensed by the sensing unit 420 is generated is converted into a digital value and is recognized by the controller 400.

For example, in the state that the voltage is applied between the plurality of sub-patterns 110*a*-110*h* and the sensing pattern 300 by the voltage unit 410, if one sub-pattern of the plurality of sub-patterns 110*a*-110*h* faces the sensing pattern 300 such that a capacitance is formed between the one sub-pattern and the sensing pattern 300, the sensing unit 420 senses the current change of the one sub-pattern having the capacitance and respectively senses the current change of the plurality of sub-patterns 110*a*-110*h*, thereby sensing the display area of the flexible display panel 100 that is variably exposed for the plurality of sub-patterns 110*a*-110*h*.

As described above, the controller 400 senses the display area that is variably exposed by sensing respective ones of the plurality of sub-patterns 110*a*-110*h* forming a capacitance by the sensing pattern 300 when the flexible display panel 100 enters and is discharged from the housing 200 in the first direction. The signal related to the exposed display area of the flexible display panel 100 and sensed by the sensing unit 420 is transmitted to the controller 400.

Figure 4:
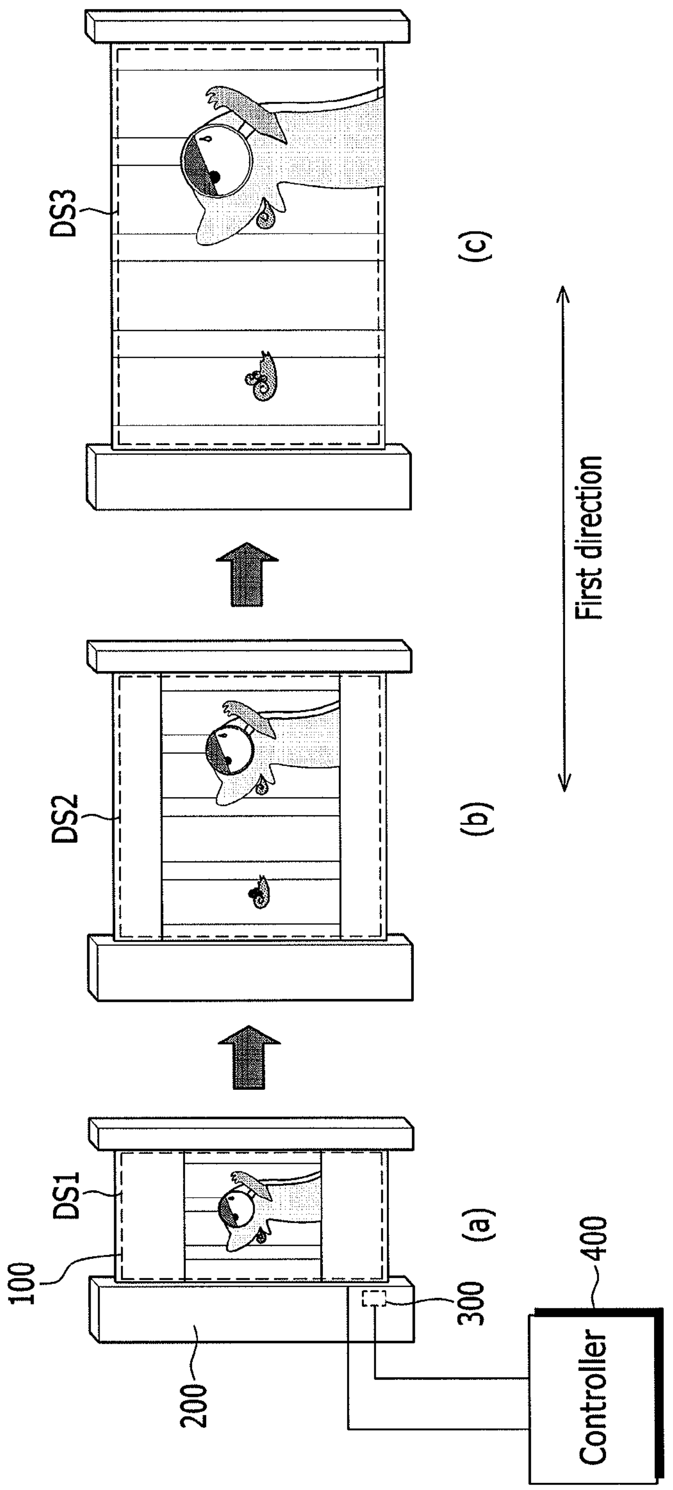
FIG. 4 is a schematic view of an image displayed in a flexible display panel of a display device according to the exemplary embodiment illustrated in FIG. 1.

FIG. 4 is a schematic view of an image displayed in a flexible display panel of a display device according to the exemplary embodiment.

In detail, as shown in portion (a) of FIG. 4, if the flexible display panel 100 enters and is discharged from the housing 200 in the first direction such that the first display area DS1 is exposed, the sensing unit 420 recognizes the current change of the sub-pattern when the first display area DS1 among the plurality of sub-patterns 110*a*-110*h* is exposed and senses the first display area DS1, and then transmits a signal related to the first display area DS1 to the controller 400. The controller 400 receives the signal and displays an image of a first size corresponding to the first display area DS1 of the flexible display panel 100. The controller 400 may store a value corresponding to the first display area DS1 of the flexible display panel 100 that is exposed corresponding to the sub-pattern when the first display area DS1 is exposed, or may load the stored value.

Also, as shown in portion (b) of FIG. 4, if the flexible display panel 100 enters and is discharged from the housing 200 in the first direction such that a second display area DS2 that is larger than the first display area D1 is exposed, the sensing unit 420 recognizes the current change of the sub-pattern when the second display area DS2 among the plurality of sub-patterns 110*a*-110*h* is exposed and senses the second display area DS2, and then transmits a signal related to the second display area DS2 to the controller 400. The controller 400 receives the signal and displays an image of a second size corresponding to the second display area DS2 of the flexible display panel 100. The controller 400 may store a value corresponding to the second display area DS2 of the flexible display panel 100 that is exposed corresponding to the sub-pattern when the second display area DS2 is exposed, or may load the stored value.

Also, as shown in portion (c) of FIG. 4 (*c*), if the flexible display panel 100 thirdly and is discharged from the housing 200 in the first direction such that a third display area DS3 that is larger than the second display area D2 is exposed, the sensing unit 420 recognizes the current change of the sub-pattern when the third display area DS3 among the plurality of sub-patterns 110*a*-110*h* is exposed and senses the third display area DS3, and then transmits the signal related to the third display area DS3 to the controller 400. The controller 400 receives the signal and displays an image of a third size corresponding to the third display area DS3 of the flexible display panel 100. The controller 400 may store a value corresponding to the third display area DS3 of the flexible display panel 100 that is exposed corresponding to the sub-pattern when the third display area DS3 is exposed, or may load the stored value.

When the flexible display panel 100 enters and is discharged for the housing 200 in the first direction, the sensing unit 420 does not recognize the entire sequence of the plurality of sub-patterns 110*a*-110*h* formed in the flexible display panel 100. Instead the sensing unit 420 senses the display area of the flexible display panel 100 corresponding to a respective one of the plurality of sub-patterns 110*a*-110*h* and recognizes the exposed display area of the flexible display panel 100 corresponding to the respective one of the plurality of sub-patterns 110*a*-110*h*. If power is supplied, the display device recognizes the current change of the sub-pattern corresponding to the display area that is currently exposed in any state and condition while monitoring the entering and discharging process of the flexible display panel 100 from the housing 200 and displays an image of a size corresponding to the exposed display area.

As described above, in the display device according to this exemplary embodiment, the sensing unit 420 of the controller 400 senses the current of the conductive pattern 110 formed in the flexible display panel 100 to sense the display area of the flexible display panel 100 that enters and is discharged from the housing 200. The image corresponding to that display area is displayed on the flexible display panel 100. A display device displaying an image that is optimized for the flexible characteristic of the flexible display panel 100 is provided.

Particularly, the display device according to this exemplary embodiment recognizes the current change of the conductive pattern 110 formed in the flexible display panel 100 by using the capacitance formed between the sensing pattern 300 and the conductive pattern 110 positioned inside the housing 200 to sense the display area of the flexible display panel 100 that enters and is discharged from the inside of the housing 200 and is exposed outside. Thereby, the display device may correctly sense the display area of the flexible display panel 100 that is discharged from the housing 200 to be exposed outside even though the exposed plate surface of the flexible display panel 100 may be discharged from the housing 200 and may be non-linearly bended. The display device according to this exemplary embodiment does not sense the entire area after the flexible display panel 100 is discharged from the housing 200, but the sensing pattern 300 recognizes the conductive pattern 110 of the flexible display panel 100 in real time to sense the display area of the flexible display panel 100 exposed when the flexible display panel 100 enters and is discharged from the housing 200, even though the exposed plate surface of the flexible display panel 100 may be flexible and non-linearly bended. The display area of the exposed flexible display panel 100 may be correctly sensed by using the conductive pattern 110, thereby displaying the image of the size corresponding to the display area.

Furthermore, the display device according to this exemplary embodiment does not count a number of rotations of the roll part 210 to indirectly sense the display area of the flexible display panel 100 and does not sense the display area of the flexible display panel 100 that is unfolded by a distance measuring means such as infrared rays or ultrasonic waves. Instead, the display device recognizes the current change of the conductive pattern 110 of the flexible display panel 100 in real time by considering the flexible characteristic of the flexible display panel 100 when the flexible display panel 100 enters and is discharged for the housing 200 to sense the exposed display area of the flexible display panel 100. Thereby, the image of the correct size corresponding to the variable display area of the flexible display panel 100 may be variably displayed in the flexible display panel 100. Satisfaction of the user of the display device may be thereby improved.

Also, in the display device according to this exemplary embodiment, the sensing pattern 300 does not recognize the entry sequence of the plurality of sub-patterns 110*a*-110*h* formed in the flexible display panel 100 when the flexible display panel 100 enters and is discharged from the housing 200 in the first direction. Instead, the sensing unit 420 respectively senses the display area of the flexible display panel 100 respectively corresponding to the plurality of sub-patterns 110*a*-110*h* to directly recognize the exposed display area of the flexible display panel 100 respectively corresponding to the plurality of sub-patterns 110*a*-110*h*. Thereby, the display device recognizes the sub-pattern corresponding to the display area that is currently exposed, if power is supplied in any state and condition, without monitoring the entering and discharging process of the flexible display panel 100 with respect to the housing 200. As a result, an image of a size corresponding to the exposed display area is displayed. In the display device according to this exemplary embodiment, the sensing unit 420 respectively and independently divides and recognizes the plurality of sub-patterns 110*a*-110*h*, thereby displaying the image of the size corresponding to the exposed display area without an additional constitution even when the power is suddenly turned off and on or when the flexible display panel 100 is unfolded and a part of it is folded.

Next, referring to FIG. 5, the display device according to another exemplary embodiment will be described.

Distinctive features differing from the exemplary embodiment illustrated in FIGS. 1 through 4 will be described. The same reference numerals are used for the same constituent elements as the previous exemplary embodiment for better comprehension and ease of description.

Figure 5:
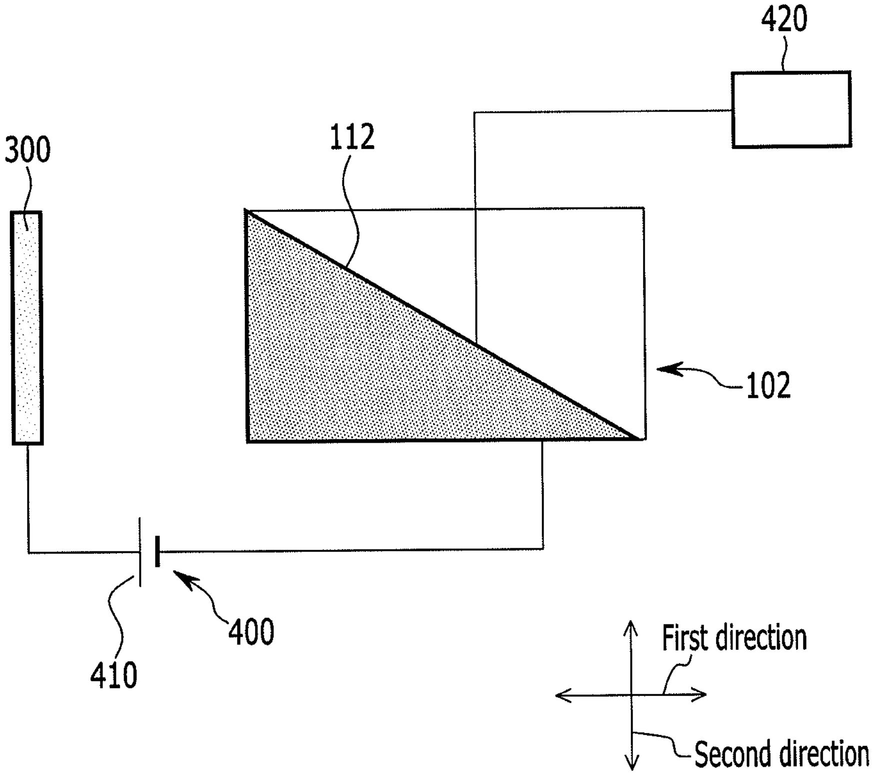
FIG. 5 is a schematic view of a flexible display panel of a display device according to another exemplary embodiment.

FIG. 5 is a schematic view of a flexible display panel of a display device according to this exemplary embodiment. FIG. 5 simultaneously shows the rear surface of the flexible display panel 102 and the sensing pattern 300 for better understanding and ease of description.

A conductive pattern 112 may be provided on the front surface of the flexible display panel 102, the rear surface thereof, or between two neighboring substrates. The conductive pattern 112 may be formed when a wire or a touch sensor for configuring the flexible display panel 102 is formed, or the conductive pattern 112 may be additionally formed on the surface of the flexible display panel 102. The conductive pattern 112 is formed of a conductor having conductivity. Current flows to the conductive pattern 112 by a voltage supplied to the controller 400. The conductive pattern 112 is formed on the flexible display panel 102 in the first direction in which the flexible display panel 102 is provided in the housing 200. The current flows to the conductive pattern 112 by the voltage supplied from the controller 400. The conductive pattern 112 is gradually increased or decreased in the second direction crossing the first direction according to a distance in the first direction.

If the conductive pattern 112 passes the sensing pattern 300, a capacitance is formed between the conductive pattern 112 and the sensing pattern 300 and the sensing unit 420 senses the current change of the conductive pattern 112 that is changed by the change of the capacitance. Thereby, the sensing unit 420 may sense the display area of the flexible display panel 102 that is drawn into or drawn out of the housing 200. When the flexible display panel 102 is drawn into or drawn out of the housing 200 in the first direction, one area of the conductive pattern 112 facing the sensing pattern 300 is different such that the current change flowing to the conductive pattern 112 is different by the capacitance that is changed according to the area of the conductive pattern 112 to be sensed by the sensing unit 420. The coordinate value of the conductive pattern 112 where the current change sensed by the sensing unit 420 is generated is converted into the digital value to be recognized by the controller 400.

Accordingly, in the display device according to this exemplary embodiment, the sensing unit 420 recognizes a current change according to the area of the conductive pattern 112 formed on the flexible display panel 102 to sense the display area of the flexible display panel 102 provided in the housing 200 and exposed to the outside. The display device displays an image corresponding to the display area of the flexible display panel 102. A display device for displaying an image that is optimized for the flexible characteristic of the flexible display panel 102 may be provided.

Next, referring to FIG. 6 and FIG. 7, a display device according to another exemplary embodiment will be described.

Parts that are different from the exemplary embodiment illustrated in FIGS. 1 to 4 will be described.

Figure 6:
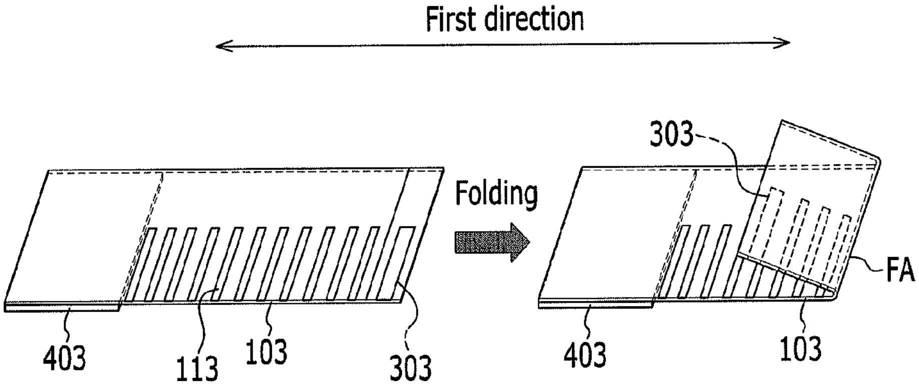
FIG. 6 is a schematic view of a display device according to another exemplary embodiment.

FIG. 6 is a schematic view of a display device according to the exemplary embodiment. FIG. 7 is a schematic view of the rear surface of the display device according to the exemplary embodiment.

Figure 7:
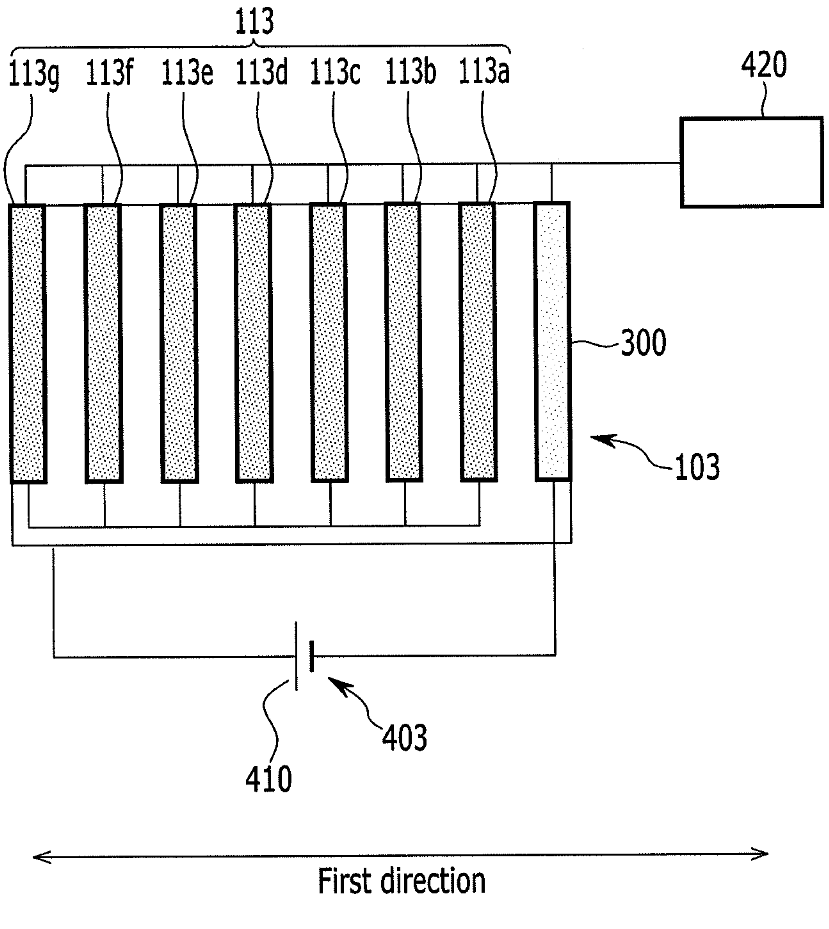
FIG. 7 is a schematic view of a flexible display panel of a display device according to the exemplary embodiment illustrated in FIG. 3.

As shown in FIG. 6 and FIG. 7, the display device according to the exemplary embodiment includes a flexible display panel 103, a sensing pattern 303, and a controller 403.

The flexible display panel 103 has the characteristic of flexibility. A first area (FA) of the flexible display panel 103 may be folded. When the first area (FA) of the flexible display panel 103 is folded, the display area of the flexible display panel 103 for displaying the image is variably exposed to the outside in the first direction. One end of the flexible display panel 103 contacts a plate surface of the flexible display panel 103 when the first area (FA) of the flexible display panel 103 is folded and provided in the first direction. The flexible display panel 103 includes a conductive pattern 113 formed on the plate surface that is a rear surface for displaying the image.

The conductive pattern 113 may be provided on the front surface of the flexible display panel 103, the rear surface thereof, or between two neighboring substrates. The conductive pattern 113 may be formed when a wire or a touch sensor for configuring the flexible display panel 103 is formed, or the conductive pattern 113 may be additionally formed on the surface of the flexible display panel 103. The conductive pattern 113 is formed of a conductor, and an insulator is formed on the conductive pattern 113. The conductive pattern 113 is formed on the flexible display panel 103 in the first direction in which a first area (FA) of the flexible display panel 103 is folded and the display area is variably exposed.

The sensing pattern 303 is provided on one end of the flexible display panel 103 contacting the plate surface of the flexible display panel 103 on which the conductive pattern 113 is formed when the first area (FA) of the flexible display panel 103 is folded. When the end of the flexible display panel 103 contacts the plate surface of the flexible display panel 103, the sensing pattern 303 contacts the insulator formed on the conductive pattern 113 thereby forming a capacitance through the insulator. The sensing unit 420 senses the current change of the conductive pattern 113 by the capacitance such that the sensing unit 420 senses the display area of the flexible display panel 103 that is variably exposed in the first direction.

As described above, in the display device according to this exemplary embodiment, the sensing unit 420 senses the current change of the conductive pattern 113 formed in the flexible display panel 103 to sense the display area of the flexible display panel 103 that is variably exposed to the outside when the first area (FA) is folded. The display device displays the image that corresponds to the display area of the flexible display panel 103. A display device for displaying an image that is optimized for the flexible characteristic of the flexible display panel 103 may be provided.

In the display device according to this exemplary embodiment, the sensing unit 420 recognizes the current change of the conductive pattern 113 by the capacitance formed between the sensing pattern 303 positioned at one end of the flexible display panel 103 and the conductive pattern 113 formed in the flexible display panel 103 to sense the display area of the flexible display panel 103 that is variably exposed to the outside when the first area (FA) is folded. When the exposed plate surface of the flexible display panel 103 is nonlinearly bent, the display area of the flexible display panel 103 exposed to the outside may be accurately sensed. Regarding the display device according to this exemplary embodiment, when the first area (FA) of the flexible display panel 103 is folded, the sensing unit 420 recognizes the current change of the conductive pattern 113 of the flexible display panel 103 in real time to sense the display area of the flexible display panel 103 exposed to the outside. When the exposed plate surface of the flexible display panel 103 is non-linearly bent, the display device uses the conductive pattern 113 to accurately sense the display area of the flexible display panel 103 exposed to the outside and thereby display an image of a size corresponding to the display area.

Further, the display device according to this exemplary embodiment does not sense the display area of the flexible display panel 103 provided in the housing. When the flexible display panel 103 is folded to sense the display area variably changed when the flexible display panel 103 is folded, the image that is optimized for the flexible display panel 103 is displayed to the flexible display panel 103. The user's satisfaction with the display device may be improved.

Further, regarding the display device according to this exemplary embodiment, after the flexible display panel 103 is folded, the sensing unit 420 recognizes one of the sub-patterns (113*a*-113*g*) formed on the flexible display panel 103 to sense the display area of the flexible display panel 103 and recognizes the exposed display area of the flexible display panel 103 corresponding to the one sub-pattern. When power is supplied to the display device under any condition, the display device recognizes the one sub-pattern corresponding to the currently exposed display area and displays the image of a size corresponding to the exposed display area without monitoring the process for folding the flexible display panel 103. The sensing unit 420 independently identifies and recognizes the sub-patterns (113*a*-113*g*) with a changed current. When the power is abruptly turned off and is then turned on or when the flexible display panel 103 is bent or other events occur, the display device according to this exemplary embodiment displays the image of a size corresponding to the display area.

The display device according to another exemplary embodiment will now be described with reference to FIG. 8 to FIG. 11.

Parts that are different from the exemplary embodiment illustrated in FIGS. 6 to 7 will be described.

Figure 8:
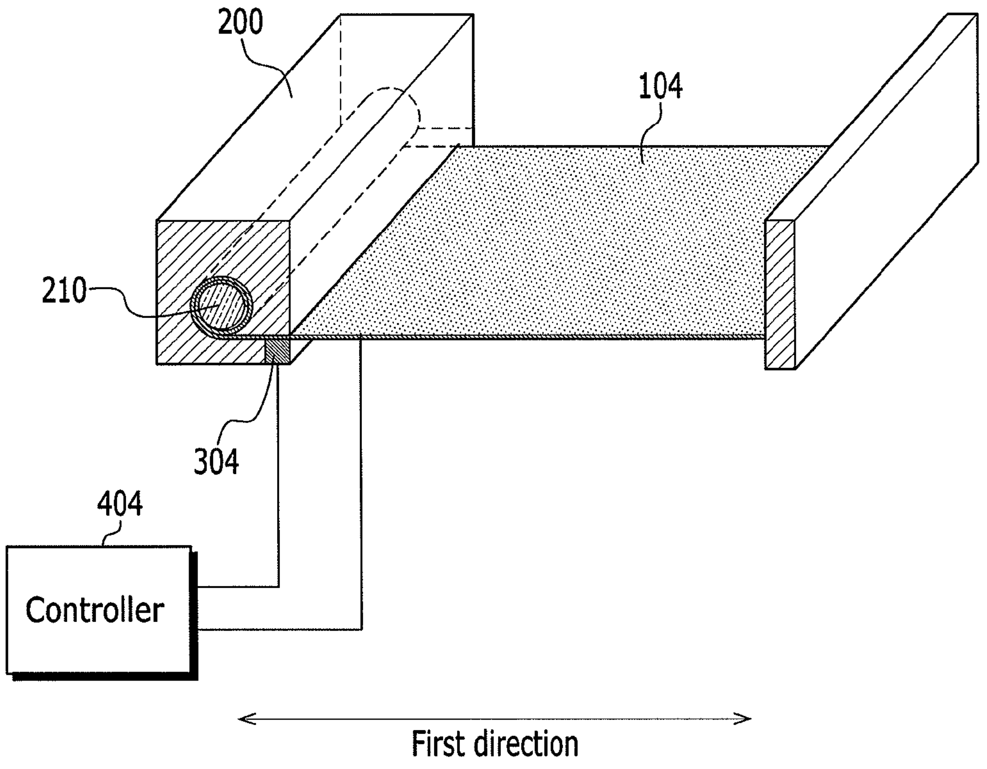
FIG. 8 is a schematic view of a display device according to another exemplary embodiment.
Figure 9:
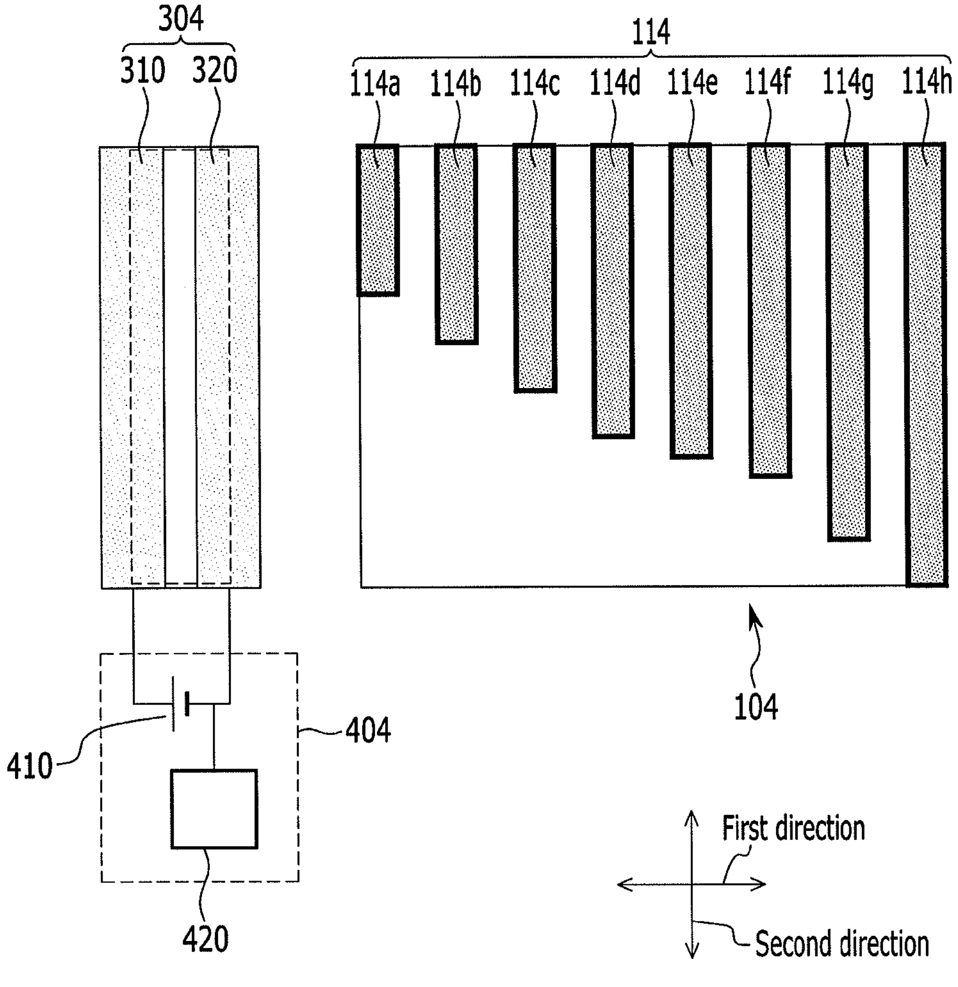
FIG. 9 is a schematic view of a flexible display panel of a display device according to the exemplary embodiment illustrated in FIG. 8.
Figure 10:
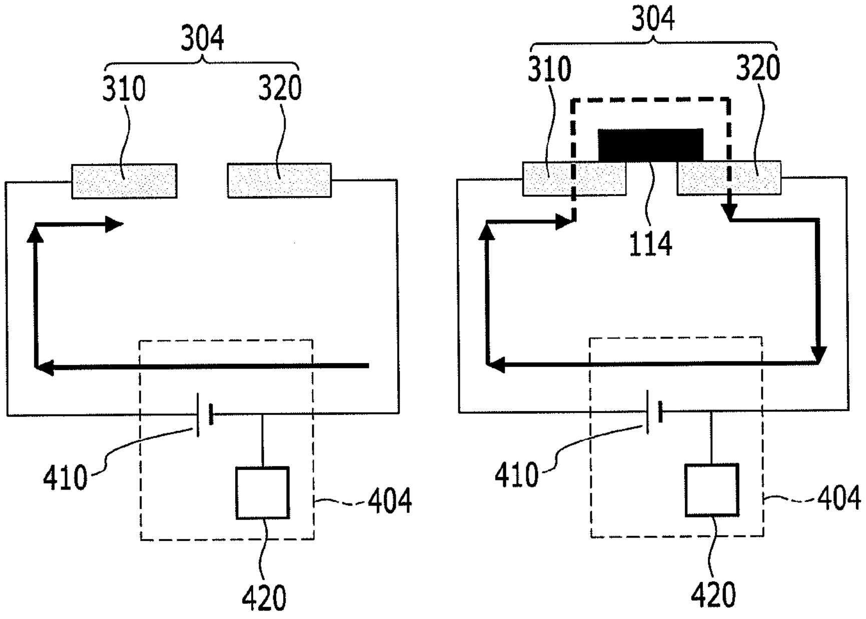
FIG. 10 and FIG. 11 are schematic views explaining a sensing method of a display device according to the exemplary embodiment illustrated in FIG. 8.
Figure 11:
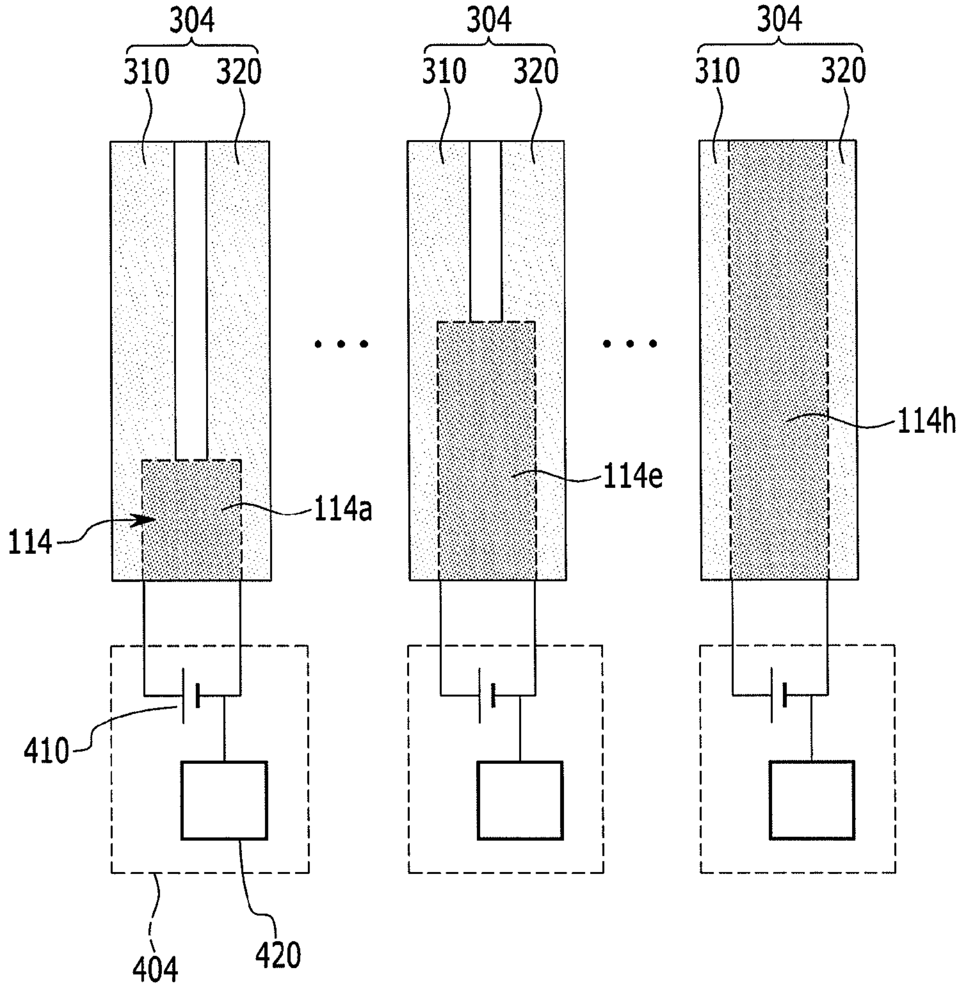

FIG. 8 is a schematic view of a display device according to this exemplary embodiment. FIG. 9 is a schematic view of a flexible display panel of a display device according to this exemplary embodiment. FIG. 10 and FIG. 11 are schematic views explaining a sensing method of a display device according to this fourth exemplary embodiment.

As shown in FIG. 8 to FIG. 11, a flexible display panel 104 of the display device according to this exemplary embodiment includes a conductive pattern 114 provided in an area of a rear surface for displaying an image.

In the display device according to this exemplary embodiment, the conductive pattern 114 is provided in one area of the rear surface of the flexible display panel 104 for displaying an image. In other implementations, the conductive pattern of the display device may be positioned at one area of a front surface of the flexible display panel for displaying an image.

The conductive pattern 114 may be provided on the front surface of the flexible display panel 104, the rear surface thereof, or between two neighboring substrates. The conductive pattern may be formed when a wire or a touch sensor for configuring the flexible display panel 104 is formed, or may be additionally formed on the surface of the flexible display panel 104. The conductive pattern 114 is formed of a conductor having conductivity. The conductive pattern 114 is formed on the flexible display panel 104 according to the first direction, the first direction being the direction that the flexible display panel 104 enters or is discharged from the housing 200. The conductive pattern 114 includes a plurality of sub-patterns (114*a*-114*h*) having different magnetism and that are separately disposed from each other in the first direction. The sub-patterns (114*a*-114*k*) separately disposed from each other in the first direction have different lengths. The length of the sub-patterns (114*a*-114*h*) is gradually increased or decreased in a second direction crossing the first direction according to a position in the first direction. The length of the sub-patterns (114*a*-114*h*) from the sub-pattern 114*a* at one end to the sub-pattern 114*h* at the other end from among the sub-patterns (114*a*-114*h*) may be gradually decreased in the second direction crossing the first direction according to a distance in the first direction. The length of the sub-patterns (114*a*-114*h*) from the sub-pattern 114*h* at the other end to the sub-pattern 114*a* at the one end from among the sub-patterns (114*a*-114*h*) may be gradually increased in the second direction crossing the first direction according to a distance in the first direction.

A sensing pattern 304 is positioned inside the housing 200.

The sensing pattern 304 is positioned inside the housing 200 while corresponding to the conductive pattern 114 formed on the flexible display panel 104 in the first direction. The sensing pattern 304 includes a first sub-sensing pattern 310 and a second sub-sensing pattern 320 that are spaced apart in the first direction. The first sub-sensing pattern 310 and the second sub-sensing pattern 320 are respectively supplied with the voltage from a controller 404. In the state that the sensing pattern 304 manually contacts the conductive pattern 114, and the first sub-sensing pattern 310 and the second sub-sensing pattern 320 are spaced from each other, and first sub-sensing pattern 310 and the second sub-sensing pattern 320 are respectively supplied with the voltage from the controller 404, the conductive pattern 114 forms a contact between the first sub-sensing pattern 310 and the second sub-sensing pattern 320 such that the current flows to the sensing pattern 304.

The controller 404 includes a voltage unit 410 respectively supplying the voltage to the first sub-sensing pattern 310 and the second sub-sensing pattern 320 and a sensing unit 420 sensing the current flowing to the sensing pattern 304. In the state that the first sub-sensing pattern 310 and the second sub-sensing pattern 320 are spaced apart from each other, and the first sub-sensing pattern 310 and the second sub-sensing pattern 320 are respectively supplied with the voltage from the controller 404, if the conductive pattern 114 forms a contact between the first sub-sensing pattern 310 and the second sub-sensing pattern 320, the current flows to the first sub-sensing pattern 310 and the second sub-sensing pattern 320. By changing the contact area between the first sub-sensing pattern 310 and the second sub-sensing pattern 320 according to each length of the plurality of sub-patterns (114*a*-114*h*) forming a contact between the first sub-sensing pattern 310 and the second sub-sensing pattern 320 to change the current flowing to the sensing pattern 304 and to sense the current change flowing to the sensing pattern 304 through the sensing unit 420, the sensing unit 420 of the controller 404 senses the display area of the flexible display panel 104 provided in the housing 200 and variably exposed to the outside in the first direction.

As described, regarding the display device according to this exemplary embodiment, the sensing unit 420 of the controller 404 senses the current change of the conductive pattern 114 formed in the flexible display panel 104 to sense the display area of the externally exposed flexible display panel 104 provided in the housing 200 and allows the image that corresponds to the display area to be displayed to the flexible display panel 104, thereby providing the display device for displaying the image that is optimized for the flexible characteristic of the flexible display panel 100.

Further, the display device according to this exemplary embodiment does not count revolutions of the roll part 210 to indirectly sense the display area of the flexible display panel 104 and does not use a distance measuring means such as infrared rays or ultrasonic waves to sense the display area of the unfolded flexible display panel 100. Instead, the display device takes into account the flexible characteristic of the flexible display panel 104, so that when the flexible display panel 104 is provided in the housing 200, the display device recognizes the current change of the sensing pattern 304 by the conductive pattern 114 in real time to sense the exposed display area of the flexible display panel 104. An image with an accurate size that corresponds to the variable display area of the flexible display panel 104 is variably displayed to the flexible display panel 100. The user's satisfaction with the display device may be improved.

Also, regarding the display device according to this exemplary embodiment, when the flexible display panel 104 is provided in the housing 200 in the first direction, the sensing pattern 304 does not recognize the order of the sub-patterns (114*a*-114*h*) formed on the flexible display panel 104. Instead, the sensing unit 420 senses the current change of the sensing pattern 304 to directly sense the exposed display area of the flexible display panel 104 corresponding to the sub-patterns (114*a*-114*h*). When power is supplied to the display device under any conditions, the display device recognizes the sub-pattern corresponding to the currently exposed display area without monitoring the process for providing the flexible display panel 104 in the housing 200 and displays an image of the size corresponding to the exposed display area. Regarding the display device according to this exemplary embodiment, the sensing unit 420 independently identifies and recognizes the sub-patterns (114*a*-114*h*) by recognizing the current change of the sensing pattern 304, thereby displaying an image of the size corresponding to the exposed display area without an additional configuration when the power is suddenly turned off and on or when the flexible display panel 104 is unfolded and a part of it is folded.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:

a flexible display panel having a display area that is variably exposed in a first direction, the flexible display panel including a conductive pattern;

a sensing pattern positioned to correspond to the conductive pattern in the first direction; and a controller sensing a current flowing to one of the conductive pattern and the sensing pattern and determining an exposed area of the display area, the controller controlling a display of an image in the flexible display panel to correspond to the exposed area of the display area of the flexible display panel.

2. The display device as claimed in claim 1, wherein the sensing pattern and the conductive pattern are spaced apart from each other.

3. The display device as claimed in claim 2, wherein the controller includes:

a voltage unit supplying a voltage to the conductive pattern and the sensing pattern, and a sensing unit sensing a current flowing to the conductive pattern.

4. The display device as claimed in claim 1, wherein the sensing pattern and the conductive pattern contact each other.

5. The display device as claimed in claim 4, wherein:

the sensing pattern includes a first sub-sensing pattern and a second sub-sensing pattern spaced apart from each other in the first direction, and the controller includes:

a voltage unit respectively supplying a voltage to the first sub-sensing pattern and the second sub-sensing pattern; and a sensing unit sensing the current flowing to the sensing pattern.

6. The display device as claimed in claim 1, further comprising a housing for receiving a varying region of the flexible display panel in the first direction such that the display area of the flexible display panel is variably exposed by the housing in the first direction.

7. The display device as claimed in claim 6, wherein the housing includes a roll unit provided in the housing, the flexible display panel being wound on the roll unit.

8. The display device as claimed in claim 6, wherein the sensing pattern is provided inside the housing corresponding to the conductive pattern.

9. The display device as claimed in claim 1, wherein one end of the flexible display panel contacts a plate surface of the flexible display panel provided in the first direction when a first area of the flexible display panel is variably bent such that the display area of the flexible display panel is variably exposed in the first direction.

10. The display device as claimed in claim 9, wherein the sensing pattern is positioned at one end of the flexible display panel.

11. The display device as claimed in claim 1, wherein the conductive pattern is arranged on the flexible display panel according to the first direction.

12. The display device as claimed in claim 11, wherein the conductive pattern includes a plurality of sub-patterns spaced apart from each other in the first direction.

13. The display device as claimed in claim 12, wherein:

the sub-patterns are gradually lengthened or shortened in a second direction crossing the first direction according to a positioning along the first direction.

14. The display device as claimed in claim 11, wherein the conductive pattern is gradually lengthened or shortened in a second direction crossing the first direction according to a positioning along the first direction.

* * * * *